(12) United States Patent
Matsuura et al.

(10) Patent No.: US 9,702,405 B2
(45) Date of Patent: Jul. 11, 2017

(54) MOVING APPARATUS

(71) Applicant: CANON KABUSHIKI KAISHA, Tokyo (JP)

(72) Inventors: Masaaki Matsuura, Kawasaki (JP); Atsushi Kohnotoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/088,783

(22) Filed: Nov. 25, 2013

(65) Prior Publication Data

US 2014/0147060 A1 May 29, 2014

(30) Foreign Application Priority Data

Nov. 27, 2012 (JP) .................. 2012-258762

(51) Int. Cl.
  *B41J 2/165* (2006.01)
  *F16C 29/02* (2006.01)
  *B41J 19/20* (2006.01)

(52) U.S. Cl.
  CPC ............... *F16C 29/02* (2013.01); *B41J 19/20* (2013.01)

(58) Field of Classification Search
  None
  See application file for complete search history.

(56) References Cited

U.S. PATENT DOCUMENTS

| 4,491,373 A | * | 1/1985 | Sugi et al. | 384/13 |
| 5,427,455 A | * | 6/1995 | Bosley | 384/106 |
| 2012/0229567 A1 | * | 9/2012 | Sawata et al. | 347/37 |
| 2013/0293634 A1 | * | 11/2013 | Shiota | 347/37 |

FOREIGN PATENT DOCUMENTS

| JP | S56-078787 A | 6/1981 |
| JP | H04-236817 A | 8/1992 |
| JP | 2006334853 | 12/2006 |
| JP | 2013-046972 A | 3/2013 |

* cited by examiner

*Primary Examiner* — Alejandro Valencia (74) *Attorney, Agent, or Firm* — Canon U.S.A. Inc., IP Division (57) ABSTRACT

A moving apparatus includes a moving member configured to reciprocate along a first direction, a guide configured to contact a sliding portion of the moving member via a lubricant and to guide a movement of the moving member, and a structure configured to restrain the lubricant applied to the guide from being squeezed out of a sliding region of the guide, where the guide contacts the sliding portion, in a second direction orthogonal to the first direction utilizing the movement of the moving member.

4 Claims, 11 Drawing Sheets

MOVING APPARATUS

BACKGROUND OF THE INVENTION

Field of the Invention

The present invention relates to an apparatus, such as a recording apparatus, having a moving member, such as a carriage, configured to convey a recording head.

Description of the Related Art

In a recording apparatus, a recording head is mounted on a carriage, and ink is discharged from the recording head while the carriage guided by a guide rail (or a guide shaft) reciprocates, whereby recording is performed on a recording medium. The guide rail (or the guide shaft) has a sliding surface, and, during the reciprocal movement of the carriage, a sliding portion of the carriage held in contact with the sliding surface slides. Since the width in the conveyance direction in which recording can be performed on a recording medium in a single reciprocal operation is limited, it is necessary for the carriage to reciprocate over and over again.

Figure 9:
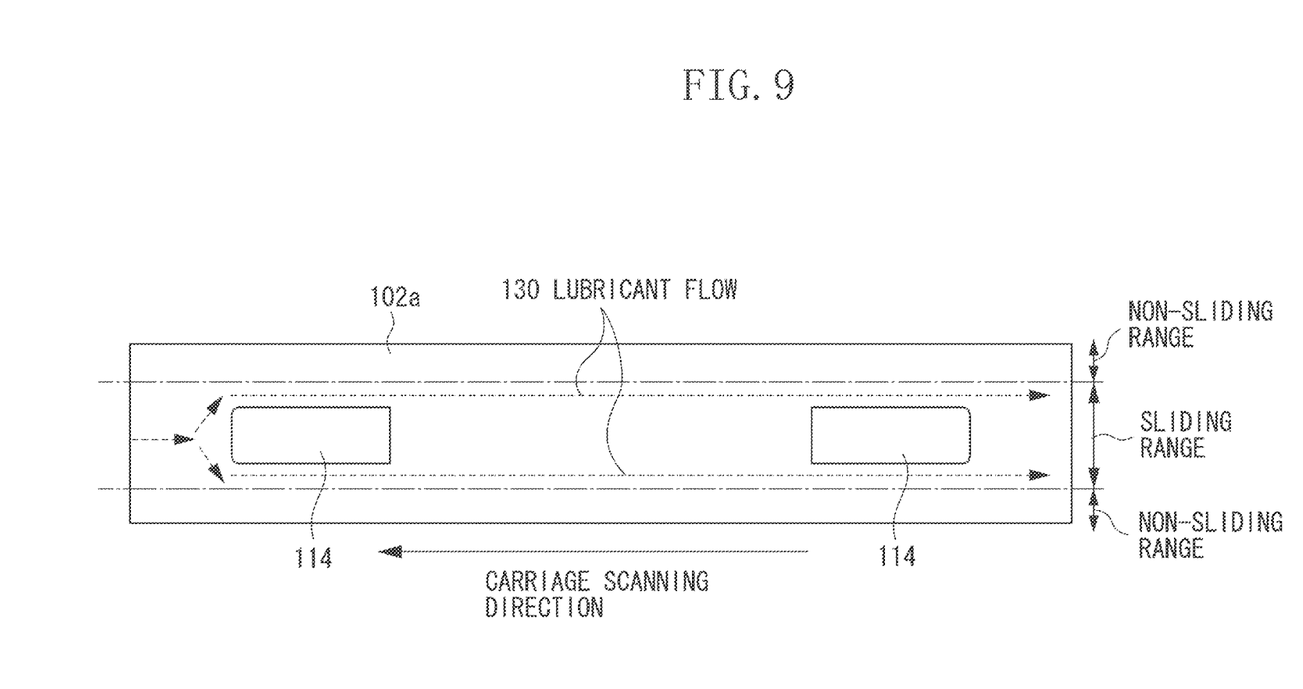
FIG. 9 illustrates a conventional carriage sliding portion.

In many recording apparatuses, a lubricant is applied to the guide rail (or the guide shaft) in order to mitigate the wear of the sliding portion of the carriage. In FIG. 9, a sliding portion support portion 102a is provided on the back surface of the carriage. A sliding portion 114 is formed on the sliding portion support portion 102a to protrude therefrom. Dashed arrows 130 in FIG. 9 indicate the movement of the lubricant on a sliding surface (not illustrated) of the guide rail when the sliding portion 114 slides on the sliding surface of the guide rail. When the carriage moves in a scanning direction, the sliding portion 114 moves to push aside the lubricant on the sliding surface. Then, the lubricant on the sliding surface of the guide rail (or the guide shaft) is squeezed out of the region where the sliding portion is held in contact with the sliding surface, resulting in deterioration in the effect of the lubricant.

In view of this, Japanese Patent Application Laid-Open No. 2006-334853 discusses a construction in which a carriage slides on a guide shaft in order to sufficiently attain the effect of a lubricant. The lubricant is scraped off at a bearing portion of the carriage and is guided to a specific portion, thereby achieving an improvement in terms of the effect of the lubricant.

As described above, in connection with the construction in which the carriage slides on the guide shaft, there has been proposed a technique for achieving an improvement in terms of the effect of the lubricant. However, in the construction in which the carriage slides on the guide rail, the sliding portion pushes the lubricant out of the sliding range as a result of the reciprocal movement of the carriage. Due to the configuration of the sliding portion, it is rather difficult to gather the lubricant pushed out of the sliding range. The result that the consumption of the lubricant is aggravated leads to an insufficiency of the effect of a lubricant, making the sliding portion subject to wear.

SUMMARY OF THE INVENTION

The present invention is directed to a moving apparatus capable of mitigating the wear of a sliding portion of a moving member for a long period of time.

According to an aspect of the present invention, a moving apparatus includes a moving member configured to reciprocate along a first direction, a guide configured to contact a sliding portion of the moving member via a lubricant and to guide a movement of the moving member, and a structure configured to restrain the lubricant applied to the guide from being squeezed out of a sliding range of the guide, where the guide contacts the sliding portion, in a second direction orthogonal to the first direction utilizing the movement of the moving member.

According to exemplary embodiments of the present invention, it is possible to mitigate the wear of a sliding portion of a moving member configured to slide while in contact with a guide portion for a long period of time.

Further features of the present invention will become apparent from the following description of exemplary embodiments with reference to the attached drawings.

DESCRIPTION OF THE EMBODIMENTS

While the following exemplary embodiments described below are applied to a recording apparatus having a carriage (moving member) configured to move with a recording head mounted thereon, the exemplary embodiments of the present invention is not restricted to the recording apparatus. The exemplary embodiments of the present invention is also applicable to an image reading apparatus having a carriage (moving member) configured to reciprocate with a reading head mounted thereon. Further, apart from the carriage, the exemplary embodiments of the present invention is also widely applicable to moving apparatuses having various moving members.

Figure 1:
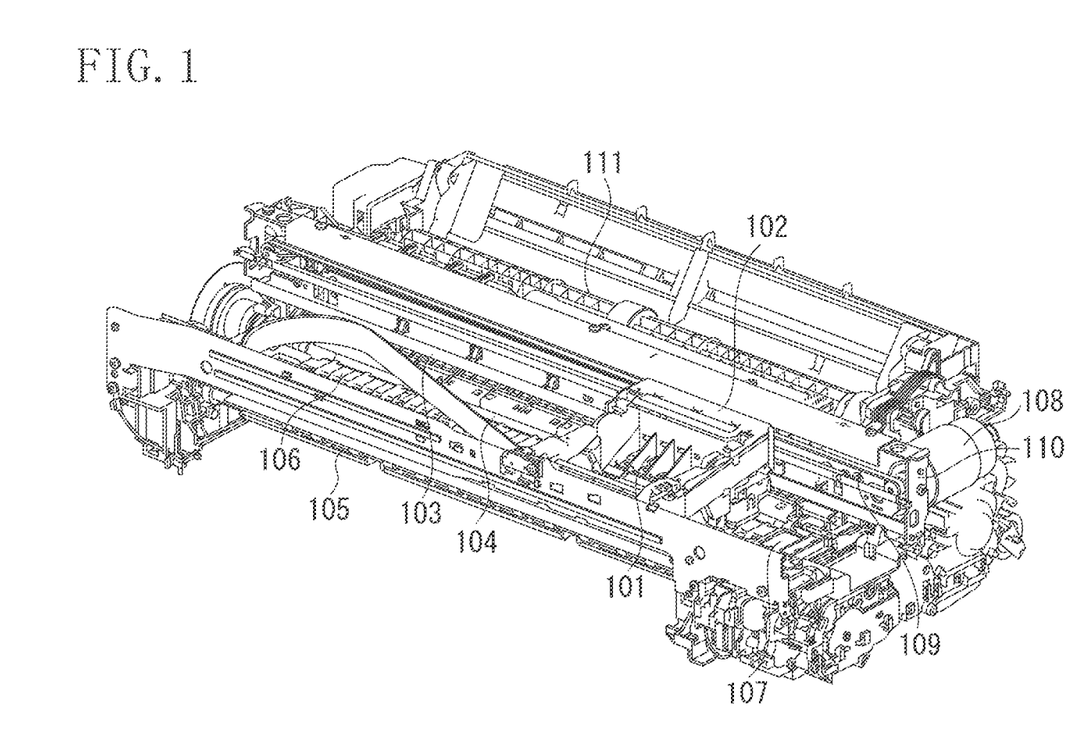
FIG. 1 is a perspective view of a recording apparatus to which exemplary embodiments of the present invention is suitably applicable.
Figure 2:
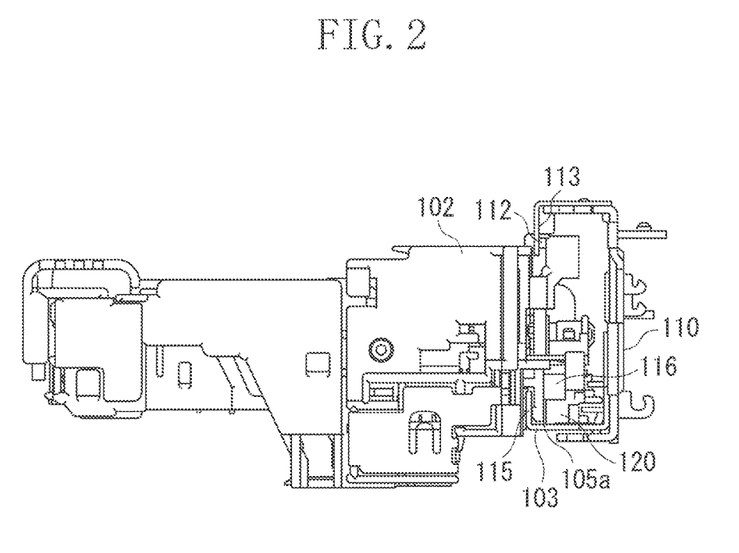
FIG. 2 is a side view of a carriage unit to which the exemplary embodiments of the present invention is suitably applicable.

FIG. 1 is a perspective view of an inkjet recording apparatus according to an exemplary embodiment, and FIG. 2 is a side view of a carriage unit.

A carriage 102 (moving member) with a recording head 101 mounted thereon is supported to be capable of reciprocating along a guide rail 103 which is a guide member extending in a main scanning direction. The guide rail 103 is formed by bending a metal plate. The carriage 102 has a support portion 112 and a sliding portion 114, and the support portion 112 of the carriage 102 is supported by a support surface 113 which is integrally formed with a chassis 110 of the recording apparatus or which is separately attached to the chassis. The support portion 112 of the carriage 102 is held in press contact with the support surface 113 by its own weight, whereby the attitude of the carriage 102 is maintained. The sliding portion 114 of the carriage 102 is formed on a sliding portion support portion 102a provided on the back surface (the upstream side surface in the recording medium conveyance direction) of the carriage 102. The sliding portion 114 is held in press contact with a sliding surface 115 of the guide rail 103 attached to the chassis 110. The carriage 102 is driven by a carriage motor 108 via a belt 109.

A recording medium such as a sheet is fed by a sheet feeding roller 111, and is conveyed onto a platen 106 by a conveyance roller 104 and a pinch roller (not illustrated). A discharge roller 105 is arranged on the downstream side in the conveyance direction with respect to the platen 106, and an auxiliary roller (not illustrated) is held in press contact with the discharge roller 105. Recording is performed by the recording head 101 on the recording medium being conveyed on the platen 106 by the conveyance roller 104 and the discharge roller 105.

At the time of recording, the carriage 102 is accelerated from a rest state, and then moves at a fixed speed throughout the recording region. At this time, ink is discharged from a discharge port 119 of the recording head 101 onto the recording medium to thereby form an image. After the completion of the recording of one line, the carriage 102 is decelerated until it stops. Next, the recording medium is fed by a predetermined amount by rotation of the conveyance roller 104 and the discharge roller 105. Then, the movement of the carriage 102 is resumed, and the next line is recorded by synchronous driving of the recording head 101. By alternately repeating the recording of one line and the feeding by a predetermined pitch, recording is performed on the entire recording medium. The recording medium which has completely undergone recording is discharged to the exterior of the apparatus main body via the discharge roller 105. A recovery unit 107 is arranged to maintain and recover ink discharge performance by preventing clogging or the like of the recording head 101.

Figure 3:
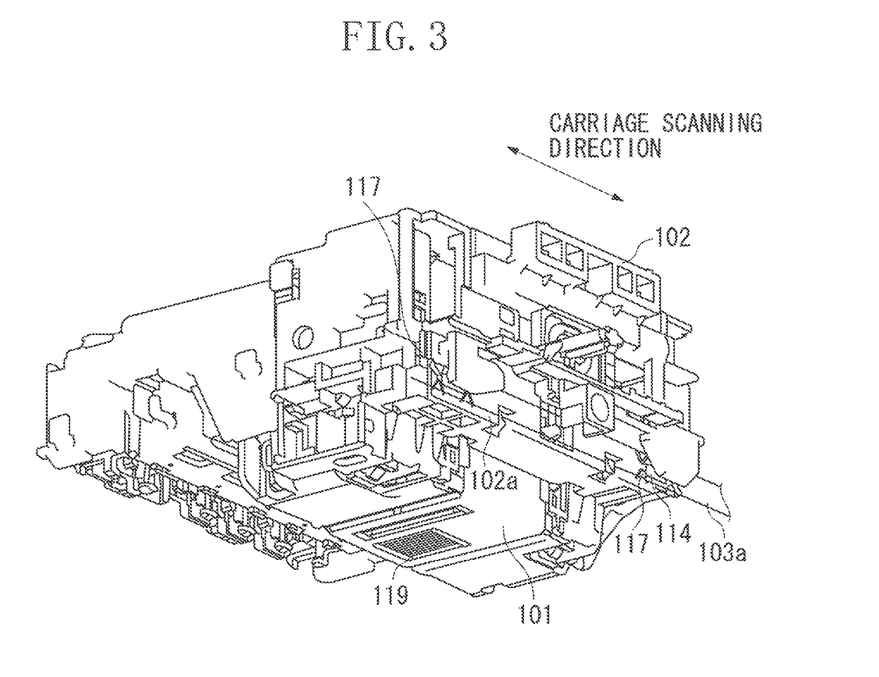
FIG. 3 is a perspective view of the carriage unit to which the exemplary embodiments of the present invention is suitably applicable.

FIG. 2 is the side view of the carriage unit and the guide rail 103 illustrated in FIG. 1, and FIG. 3 is a perspective view of the carriage unit. When the carriage 102 reciprocates in the horizontal direction, the sliding portion 114 of the carriage 102 slides in a sliding region that is a part of a sliding surface 115 which is a flat surface formed on the guide rail 103. A lubricant is applied to the sliding surface 115 of the guide rail 103. As a result, the carriage 102 can smoothly slide along the guide rail 103. In FIG. 3, a portion 103a which corresponds to the portion forming the sliding surface 115 of the guide rail 103 (sliding surface forming portion) is solely illustrated as a transparent portion.

Figure 4:
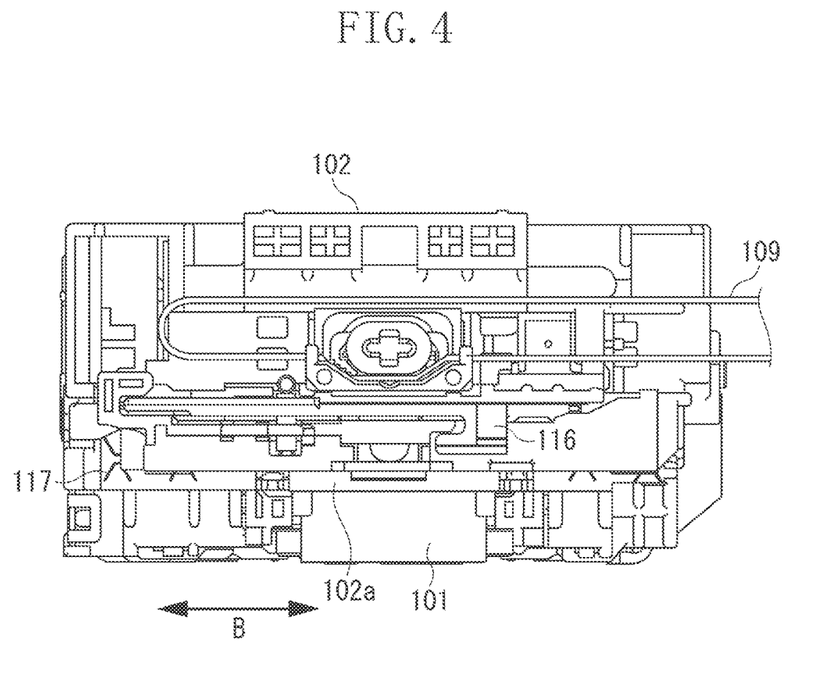
FIG. 4 is a rear view of the carriage unit to which the exemplary embodiments of the present invention is suitably applicable.
Figure 5:
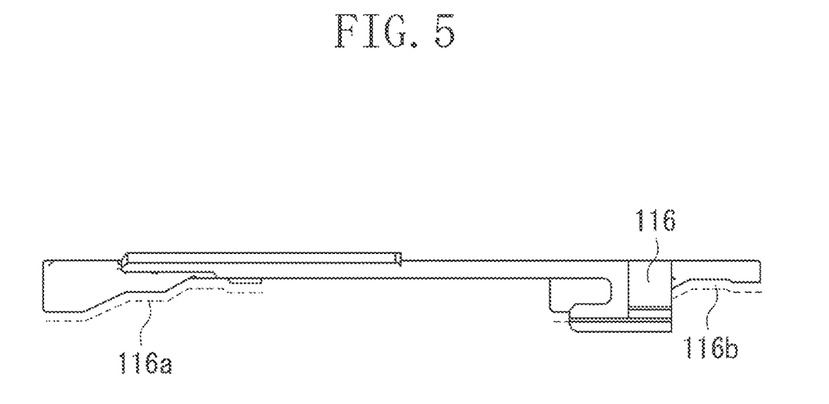
FIG. 5 is a rear view of a distance control member.

Further, in some cases, the carriage 102 adjusts, depending on the type of recording medium, the distance between the discharge port 119 of the recording head 101 and the platen 106 (This will be hereinafter referred to as a "head-to-paper distance adjustment." FIG. 4 is a rear view of the carriage unit, and FIG. 5 is a perspective view of a distance control member 116 configured to vertically move the carriage 102 with respect to the platen 106 to make the head-to-paper distance adjustment. A sliding block 120 of the carriage 102 slides while in contact with the horizontal sliding surface 105a of the guide rail 103. The sliding block 120 comes into contact with cam surfaces 116a and 116b of a plurality of heights of the distance control member 116, whereby its position in the height direction with respect to the main body of the carriage 102 is determined. By causing the distance control member 116 in the carriage unit to slide in the direction of the arrow B, the height of the cam surface of the distance control member 116 brought into contact with the sliding block 120 is switched, and the position in the height direction of the sliding surface of the sliding block 120 with respect to the main body of the carriage 102 is changed. When the position in the height direction of the sliding surface (lower surface) of the sliding block 120 with respect to the main body of the carriage 102 is changed, the main body of the carriage 102 can move vertically with respect to the guide rail 103.

Figure 6A:
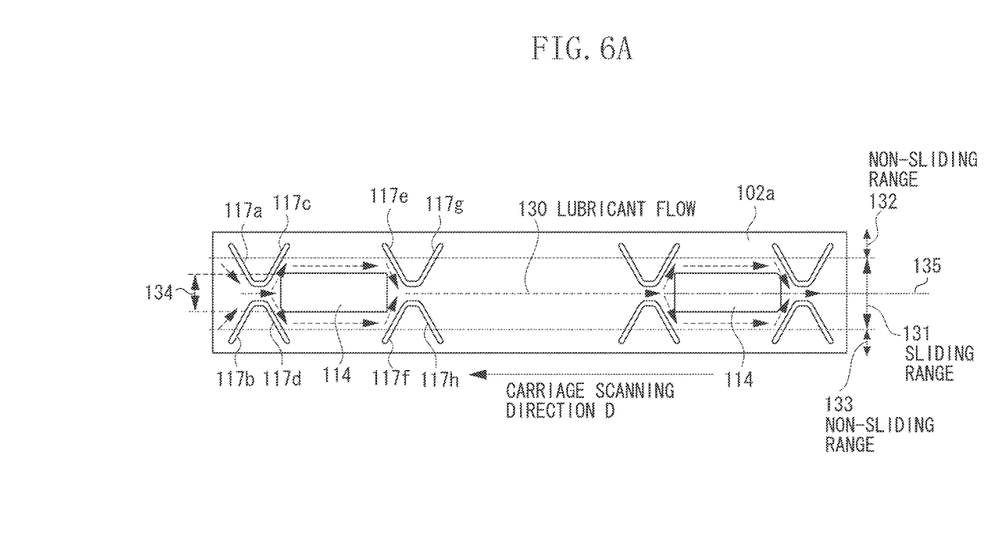
FIGS. 6A and 6B illustrate a carriage sliding portion and a lubricant leading portion according to a first exemplary embodiment of the present invention.
Figure 6B:
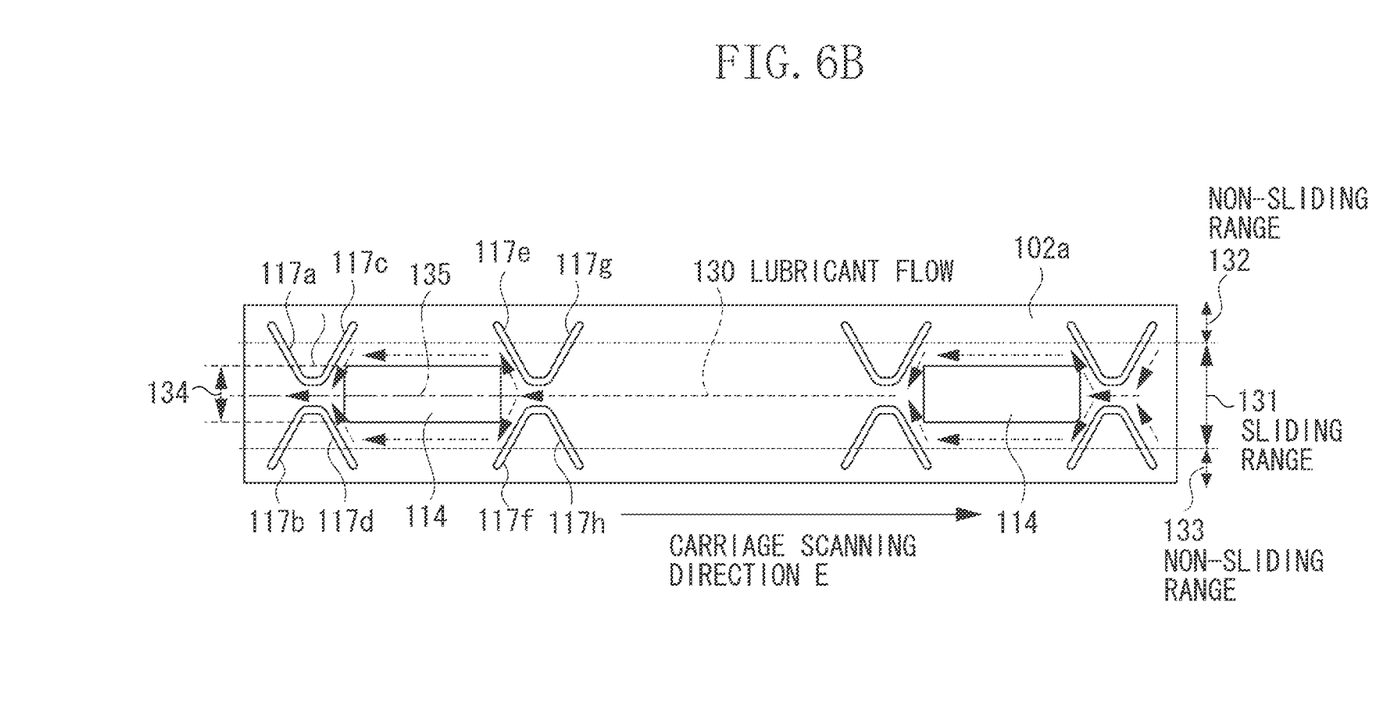

FIGS. 6A and 6B illustrate a sliding portion support portion 102a of the carriage 102 according to the first exemplary embodiment of the present invention. The sliding portion support portion 102a is provided with the sliding portion 114 and a lubricant leading portion 117. The lubricant leading portion 117 is formed integrally with the sliding portion support portion 102a, and is a rib-like member protruding in a substantially the same height with the sliding surface of the sliding portion 114 or lower than that with respect to the sliding portion support portion 102a.

The lubricant leading portion 117, which moves together with the sliding portion 114 along the sliding surface 115 of the guide rail 103 in a first direction constituting the scanning direction, has a surface by which the lubricant applied to the sliding surface 115 is gathered in the sliding region where the sliding portion 114 slides while in contact with the surface.

The lubricant leading portion 117 gathers the lubricant in the sliding region by utilizing the movement of the sliding portion 114 of the carriage. The lubricant leading portion 117 is configured to restrain the lubricant applied to the guide rail 103 from being squeezed out of the sliding region of the guide rail 103 in contact with the sliding portion in a second direction orthogonal to the first direction. The lubricant leading portion 117 configured to gather a lubricant has a leading portion 117a configured to spread in the main scanning direction as it moves away from the sliding portion 114 of the carriage in the main scanning direction. Further, the lubricant leading portion 117 has a leading portion 117b configured to be narrowed in the main scanning direction as it moves away in the main scanning direction from the sliding portion for maintaining the lubricant in a sliding range. The leading portion 117a and the leading portion 117b are arranged to be astride the sliding range and the non-sliding range which are perpendicular to the main scanning direction of the sliding portion 114 of the carriage 102. Here, the term "sliding range" refers to a range covering the entire sliding region to be changed vertically by the vertical movement of the carriage 102 due to the head-to-paper distance adjustment. As a result, it is possible to lead a lubricant into the sliding range of the sliding portion 114 of the carriage 102 regardless of the position in the vertical direction to which the carriage 102 moves for head-to-paper distance adjustment. Further, by respectively providing lubricant leading portions 117 at both end portion sides of the sliding portion 114 of the carriage 102, it is possible to lead the lubricant in no matter which direction the carriage 102 may move as indicated by dashed arrows 130 in FIGS. 6A and 6B. The lubricant leading portions 117 may be formed integrally with the carriage 102, or may be provided separately from the carriage 102.

In the case where the lubricant leading portions 117 are provided integrally with the carriage 102, it is very difficult to process the sliding portion 114 of the carriage 102 and the lubricant leading portions 117 to the same height. In that case, the lubricant leading portions 117 may be slightly lower than the sliding portion 114 of the carriage 102 and slightly spaced away from the sliding surface 115 of the guide rail 103. Also in the case where the lubricant leading portions 117 are slightly spaced away from the sliding surface 115, the portion of the lubricant gathered higher than the gaps between the lubricant leading portions 117 and the sliding surface 115, is led to the sliding range by the lubricant leading portions 117. Further, when they are worn as a result of the scanning movement of the carriage 102, the lubricant leading portions 117 and the sliding portion 114 of the carriage 102 become the same height, making it possible for the lubricant leading portions 117 to lead the lubricant to the sliding range. Thus, it is also possible to adopt a construction in which the lubricant leading portions 117 are slightly spaced away from the sliding surface 115 of the guide rail 103.

FIG. 6A illustrates the movement of the lubricant when the carriage 102 performs scanning in the direction of the arrow D, which is the first scanning direction (forward direction). The leading portions 117a and 117b, which are first leading portions of the lubricant leading portions 117 situated on the front side in the first scanning direction of the carriage 102 with respect to the sliding portion 114, are oriented in the first scanning direction. Further, the leading portions 117a and 117b are arranged such that the nearer the center 135 in the width direction of the sliding range 131, the further upstream they are situated in the scanning direction. Prior to the passage of the sliding portion 114, the leading portions 117a and 117b lead the lubricant adhering to the sliding surface 115 toward the center 135 in the width direction of the sliding range 131 as indicated by the dashed arrows 130. Leading portions 117e and 117f, which are first leading portions of the lubricant leading portion 117 and situated on the rear side in a second scanning direction of the carriage 102 with respect to the sliding portion 114, are oriented in the first scanning direction. Further, the leading portions 117e and 117f are arranged such that the nearer the center 135 in the width direction of the sliding range 131, the further upstream they are situated in the first scanning direction. The leading portions 117e and 117f gather, in the vicinity of the center of the sliding range 134, the lubricant pushed aside to the outer side of the region which the sliding portion 114 have contacted at the time of the passage. Here, the center of the sliding region 134 in the width direction orthogonal to the moving direction of the carriage 102 coincides with the center in the width direction of the sliding range 131. However, the position of the center in the width direction of the sliding range 134 varies in the vertical direction by the height adjustment of the carriage 102.

FIG. 6B illustrates the movement of the lubricant when the carriage 102 performs scanning in the direction of the arrow E, which is a second scanning direction (backward direction) opposite the first scanning direction. Leading portions 117g and 117h which are second leading portions of the lubricant leading portions 117 situated on the front side in the second scanning direction of the carriage 102 with respect to the sliding portion 114, are oriented in the second scanning direction. Further, the leading portions 117g and 117h are arranged such that the nearer the center 135 in the width direction of the sliding region 134, the further upstream they are situated in the scanning direction. Prior to the passage of the sliding portion 114, the leading portions 117g and 117h gather, in the vicinity of the center of the sliding range 131, the lubricant as indicated by the dashed arrows 130. The leading portions 117c and 117d which are second leading portions of the lubricant leading portions 117 situated on the rear side in the second scanning direction of the carriage 102 with respect to the sliding portion 114, are oriented in the second scanning direction. Further, the leading portions 117c and 117d are arranged such that the nearer the center 135 in the width direction of the sliding region 134, the further upstream they are situated in the second scanning direction. The leading portions 117c and 117d gather, in the vicinity of the center of the sliding range 131, the lubricant pushed aside to the outer side of the region in contact with the sliding portion 114 as a result of the passage of the sliding portion 114.

Each of the first leading portion 117a and the second leading portion 117c, and the first leading portion 117b and the second leading portion 117d, forms integral surface continuous with each other in the vicinity of the center 135 of the sliding region 134. Similarly, each of the first leading portion 117e and the second leading portion 117g, and the first leading portion 117f and the second leading portion 117h, forms integral surface continuous with each other in the vicinity of the center 135 of the sliding region 134. In this way, the surface gathering a lubricant at the central side when the carriage 102 performs scanning in the first scanning direction and the surface gathering a lubricant at the central side when the carriage 102 performs scanning in the second scanning direction, are continuous with each other in the vicinity of the center. Thus, it is possible to gather the lubricant at the central side regardless of the direction in which the scanning is performed. Further, the set of first leading portions and the set of second leading portions continuous therewith are respectively formed on both sides of the center 135 of the sliding region 134. In the present exemplary embodiment, the lubricant is led by utilizing the movement of the carriage, preventing movement of the lubricant from the inner side to the outer side of the sliding region in the direction (second direction) orthogonal to the scanning direction (first direction). That is, the lubricant leading portions 117 function as a structure restraining the lubricant from being squeezed out of the sliding region in the direction orthogonal to the scanning direction.

Figure 7:
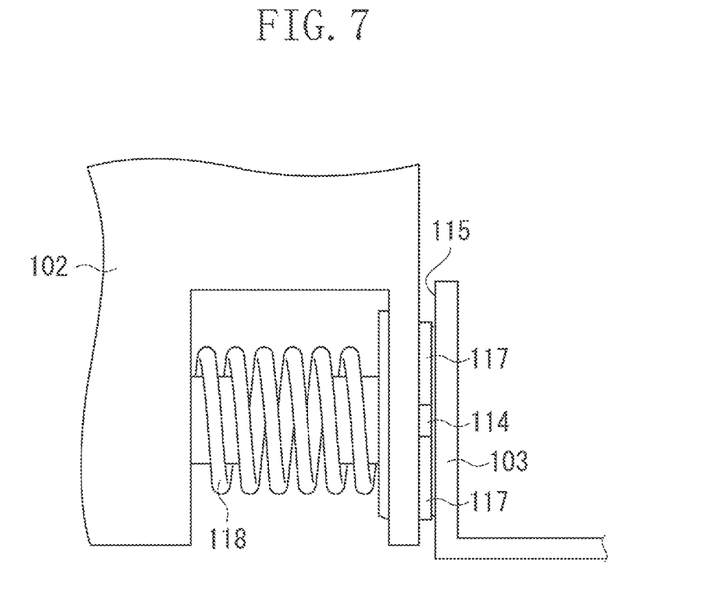
FIG. 7 is an enlarged side view of a carriage sliding portion and a lubricant leading portion according to a second exemplary embodiment of the present invention.

FIG. 7 is an enlarged side view of the sliding portion 114 of the carriage 102 and the lubricant leading portions 117 according to a second exemplary embodiment of the present invention. In the construction, the lubricant leading portions 117 in FIGS. 6A and 6B are urged by a spring 118 to be constantly pressed against the guide rail 103. As a result, even when the lubricant leading portions 117 are worn prior to the sliding portion 114 of the carriage 102, the lubricant leading portions 117 are held in contact with the sliding surface 115 of the guide rail 103 by the spring force, so that it is possible to constantly lead the lubricant to the sliding range. The spring force with which the spring 118 presses the lubricant leading portions 117 is very small, and the contact force with which the sliding portion 114 is held in contact with the guide rail 103 due to the weight of the carriage 102 is larger than the spring force. Due to this relationship between the spring force of the spring 118 and the contact force of the sliding portion 114, there is no possibility of the sliding portion 114 of the carriage 102 being spaced away from the guide rail 103.

Figure 8A:
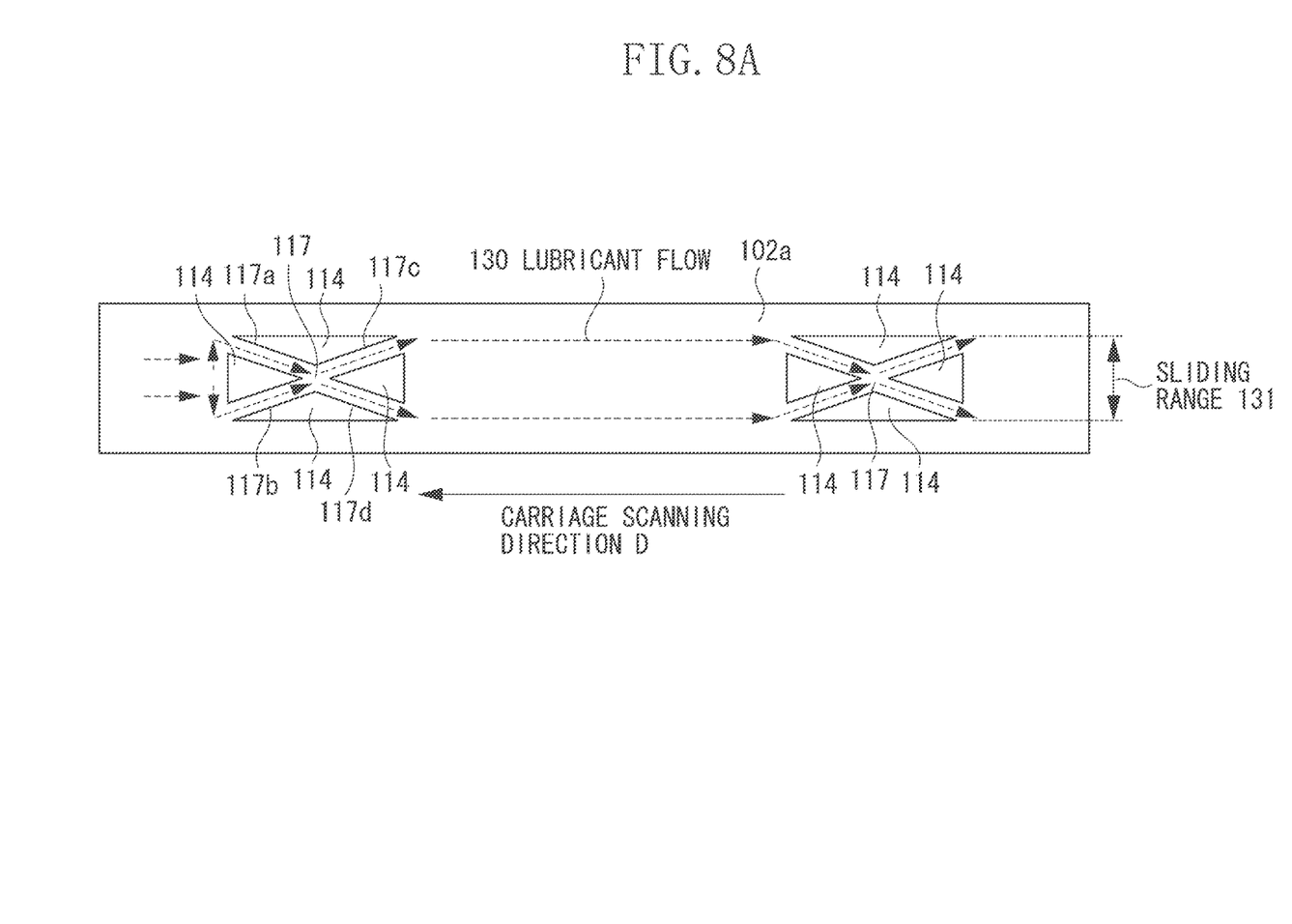
FIGS. 8A and 8B illustrate a carriage sliding portion and a lubricant leading portion according to a third exemplary embodiment of the present invention.
Figure 8B:
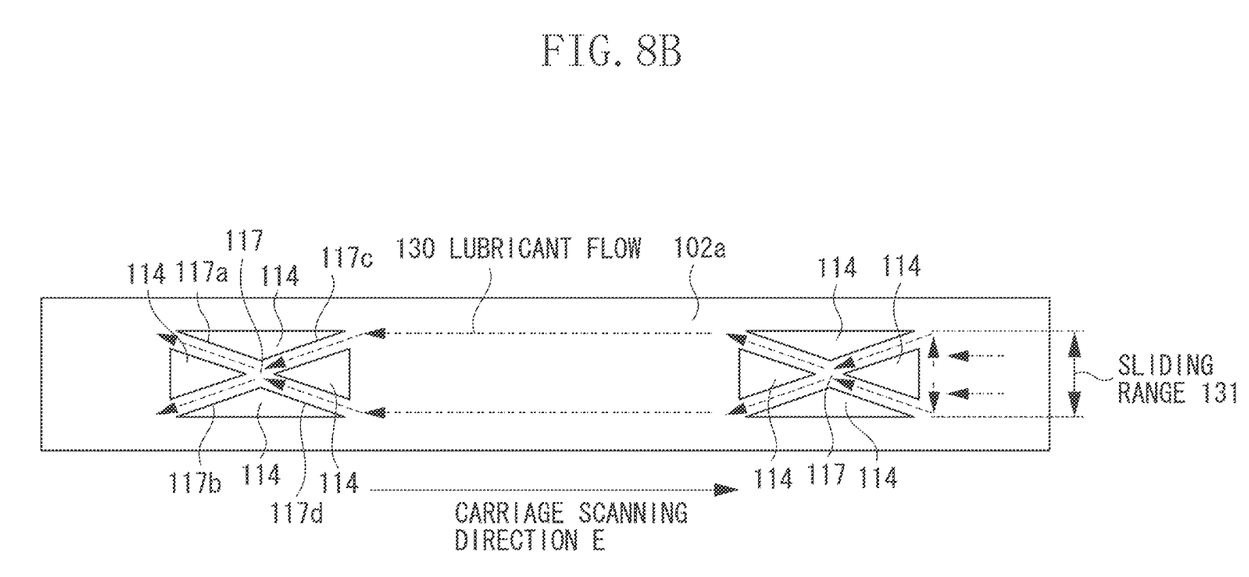

FIGS. 8A and 8B illustrate the sliding portion 114 of the carriage 102 according to a third exemplary embodiment of the present invention. The sliding portion 114 is provided with lubricant leading portions 117 having a groove shape spreading with respect to the main scanning direction as it recedes from the main scanning direction, and a groove shape narrowing with respect to the main scanning direction as it recedes from the main scanning direction. As indicated by the dashed lines in FIGS. 8A and 8B, it is possible for the lubricant leading portions 117 to lead a lubricant into the range of the sliding range 131 in whichever direction the carriage 102 may advance regardless of the scanning direction of the carriage 102.

By providing the sliding portion 114 with lubricant leading portions 117 of the groove shapes, there are formed leading portions 117a, 117b, 117c, and 117d in the sliding portion 114.

FIG. 8A illustrates the movement of the lubricant when the carriage 102 performs scanning in the direction of the arrow D, which is the first scanning direction. The first leading portions 117a and 117b of the lubricant leading portions 117 are oriented in the first scanning direction, and are arranged such that the nearer the center of the sliding region, the further upstream they are situated in the first scanning direction. On the inner side of the sliding portion 114, the leading portions 117a and 117b gather the lubricant in the vicinity of the center of the sliding range 131 as indicated by the dashed arrows 130.

FIG. 8B illustrates the movement of the lubricant when the carriage 102 performs scanning in the direction of the arrow E, which is the second scanning direction. The second leading portions 117c and 117d of the lubricant leading portions 117 are oriented in the second scanning direction, and are arranged such that the nearer the center of the sliding range, the further upstream they are situated in the second scanning direction. The leading portions 117c and 117d gather the lubricant in the vicinity of the center of the sliding range 131 as indicated by the dashed arrows 130. In the present exemplary embodiment, the lubricant is led by utilizing the movement of the carriage, preventing the lubricant from moving outwards from within the sliding region where the sliding portion 114 slides. That is, the lubricant leading portions 117 function as a structure restraining the lubricant from being squeezed out of the sliding region in the direction orthogonal to the scanning direction.

In the above-described exemplary embodiments, the lubricant squeezed out of the sliding region by the sliding portion of the carriage is gathered in the sliding region of the carriage sliding portion. In other words, it is possible to restrain the lubricant from being squeezed out of the sliding region. As a result, it is possible to mitigate the wear of the carriage sliding portion due to the reciprocal movement of the carriage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-258762 filed Nov. 27, 2012, which is hereby incorporated by reference herein in its entirety.

What is claimed is:

1. An inkjet recording apparatus comprising:
   a guide having a vertical flat surface extending in a first direction that is horizontal;
   a carriage mounting an inkjet recording head configured to reciprocate along the guide in the first direction, wherein the carriage has a contact slide portion sliding on the vertical flat surface with a lubricant;
   a platen configured to support a sheet to be recorded by the inkjet recording head;
   a mechanism to change a height of the carriage relative to the platen by moving the carriage in a second direction that is vertical along the vertical flat surface; and
   a first rib-like structure and a second rib-like structure each formed on the carriage such that the contact slide portion is disposed between the first and the second rib-like structures in the first direction, wherein in each of the first and the second rib-like structures, a plurality of ribs forms a cross-like shape having a size larger than the contact slide potion in the second direction and a center of the cross-like shape in the second direction is rid of ribs, whereby the first and the second rib-like structures gather the lubricant on the vertical flat surface toward the center in the second direction while the carriage reciprocates,
   wherein a sliding region on the vertical flat surface, in which the contact surface slides while the carriage reciprocates, shifts in the second direction according to changing of the height of the carriage changed by the mechanism.

2. The inkjet recording apparatus according to claim 1, wherein the contact slide potion has a rectangular shape and contacts with the vertical flat surface, whereas the first and the second rib-like structures are slightly spaced away from the vertical flat surface.

3. The inkjet recording apparatus according to claim 1, wherein the contact slide portion and the first and the second rib-like structures are supported on a support member provided at a bottom of the carriage.

4. The inkjet recording apparatus according to claim 1,
   wherein, when the carriage moves in the first direction toward one end, the first rib-like structure gathers the lubricant toward the center in the second direction, the gathered lubricant passes through the center and is pushed aside of the contact slide portion in the second direction, then the second rib-like structure gathers the pushed lubricant toward the center in the second direction,
   wherein, when the carriage moves in the first direction toward the other end, the second rib-like structure gathers the lubricant toward the center in the second direction, the gathered lubricant passes through the center and is pushed aside of the contact slide portion in the second direction, then the first rib-like structure gathers the pushed lubricant toward the center in the second direction, and
   wherein the first rib-like structure and the second rib-like structure restrain the lubricant from being squeezed out of a sliding region in the in the second direction.

* * * * *